(12) United States Patent
Haimov et al.

(10) Patent No.: US 12,380,249 B2
(45) Date of Patent: Aug. 5, 2025

(54) ACCESS CONTROL MANAGEMENT FOR SYSTEMS

(71) Applicant: Dell Products L.P., Round Rock, TX (US)

(72) Inventors: Nisan Haimov, Beer Sheva (IL); Boris Shpilyuck, Ashdod (IL); Igor Dubrovsky, Beer Sheva (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 236 days.

(21) Appl. No.: 18/468,278

(22) Filed: Sep. 15, 2023

(65) Prior Publication Data

US 2025/0094642 A1    Mar. 20, 2025

(51) Int. Cl.
*G06F 21/64*    (2013.01)
*G06F 21/60*    (2013.01)

(52) U.S. Cl.
CPC ........... *G06F 21/64* (2013.01); *G06F 21/602* (2013.01); *G06F 21/604* (2013.01)

(58) Field of Classification Search
CPC .......... G06F 8/61; G06F 21/57; G06F 21/577; G06F 21/602; G06F 21/604; G06F 21/62–629; G06F 21/64; G06F 2221/033; G06F 2221/2141; H04L 63/1433; H04L 63/20
See application file for complete search history.

(56) References Cited

U.S. PATENT DOCUMENTS

| | | | |
|---|---|---|---|
| 2016/0139915 A1* | 5/2016 | Dimitrakos | G06F 8/61 717/126 |
| 2021/0056200 A1* | 2/2021 | Rudnik | G06F 21/53 |
| 2023/0029624 A1* | 2/2023 | Olejarz | G06F 8/77 |

\* cited by examiner

*Primary Examiner* — Kevin Bechtel
(74) *Attorney, Agent, or Firm* — WOMBLE BOND DICKINSON (US) LLP

(57) ABSTRACT

Methods and systems for managing the operation of data processing systems are disclosed. To manage the operation of the data processing systems, access control standards for software may be enforced during development and/or deployment of software. The access control standards may indicate the extent of access controls for data that are to be in place for various pieces of software. The access control standards may also indicate a level of consistency in the sources of truth for permissions enforced by the access controls.

20 Claims, 7 Drawing Sheets

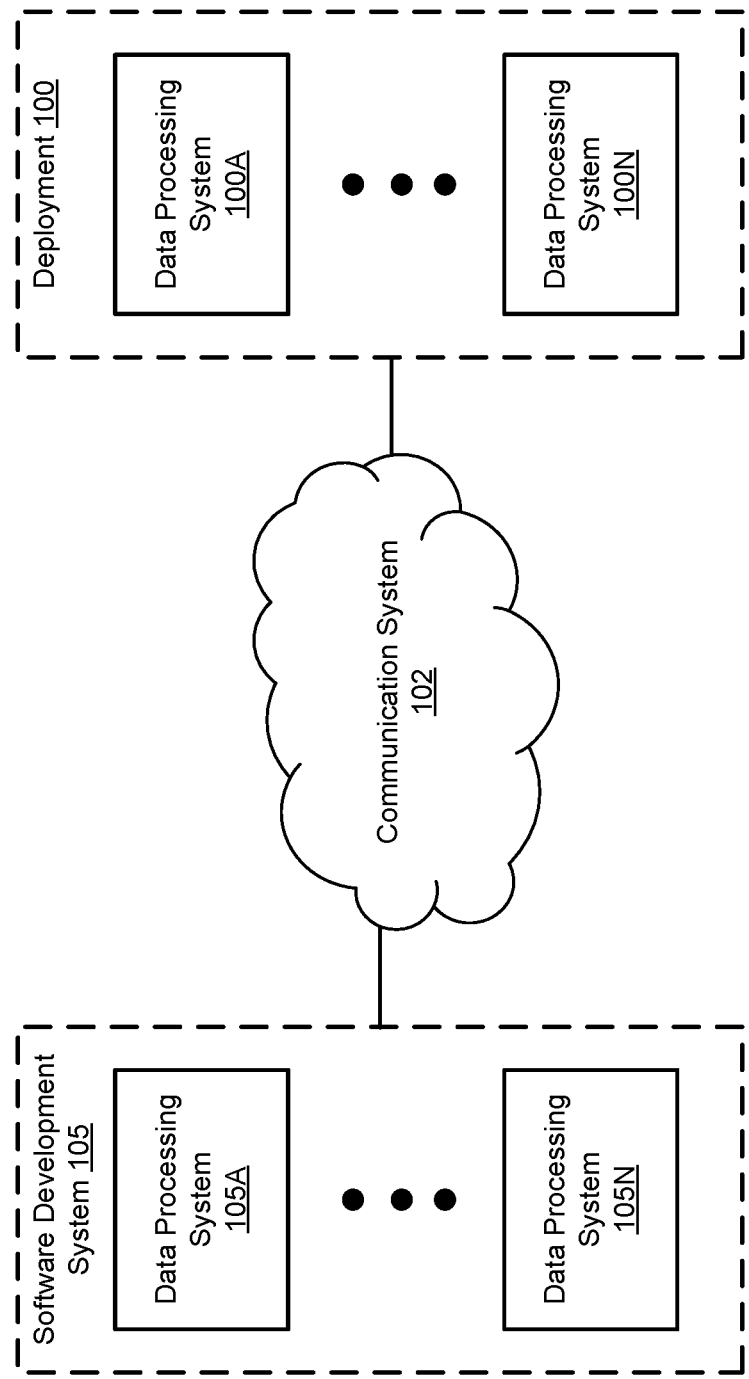

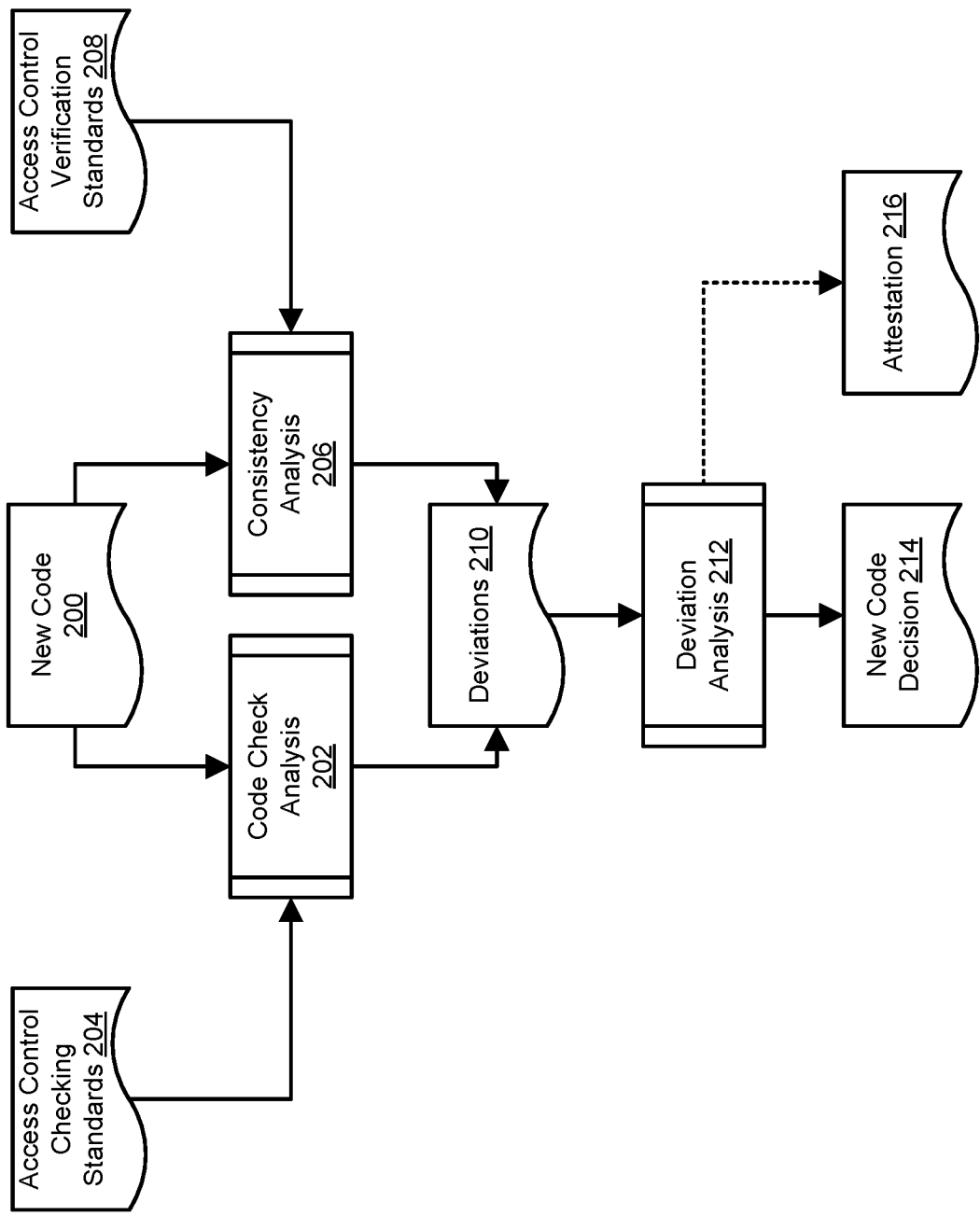

ACCESS CONTROL MANAGEMENT FOR SYSTEMS

FIELD

Embodiments disclosed herein relate generally to management of systems. More particularly, embodiments disclosed herein relate to management of access control in systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1 shows a diagram illustrating a system in accordance with an embodiment.

FIG. 2A-2C show data flow diagrams in accordance with an embodiment.

DETAILED DESCRIPTION

Figure 2B:
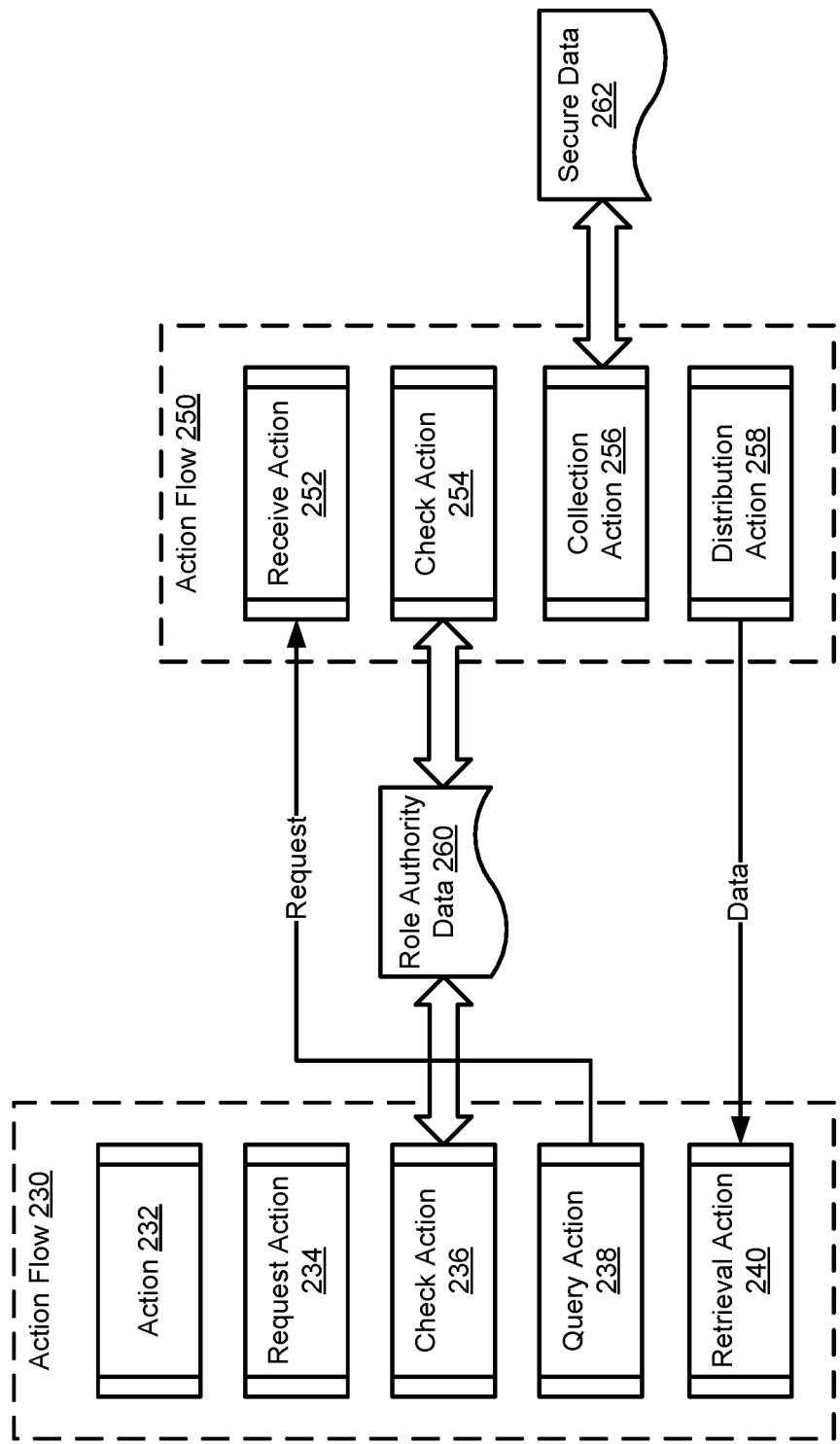

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services using data processing systems. To provide computer implemented services, data processing systems may be deployed to a location. The data processing systems may provide the services cooperatively and/or individually.

To provide different types of services, various software may be hosted by the data processing systems. The software may cause different types of services to be provided.

However, the quality of software also impacts the quality of the provided services. For example, software that exhibits vulnerability or other undesired activity may cause the services to also exhibit undesired behavior.

To reduce the likelihood of software exhibiting undesired behavior, restrictions on use and development of the software may be enforced. The restrictions may enforce standards on the software. The standards may relate, for example, to access controls for various pieces of data. By improving the likelihood that access control are in place, undesired access to the data may be reduced.

Additionally, the standards may relate to consistency in sources of truth for permissions for access to data. By enforcing consistency in the sources of truth used in access control, the software may be less likely to leak sensitive data to unauthorized entities.

Thus, embodiments disclosed herein may address, among others, the technical problem of access management for data. By enforcing standards related to access to data, software used to provide computer implemented services may be less likely to facilitate undesired access to data.

In an embodiment, a method for securing a deployment comprising data processing systems is provided. The method may include identifying software for deployment to a data processing system of the data processing systems; based on the identifying of the software: identifying at least one certificate for the software; making a determination regarding whether the at least one certificate establishes that the software meets access control standards for the data processing system; in a first instance of the determination where the at least one certificate establishes that the software meets the access control standards for the data processing system: deploying the software to the data processing system, and providing computer implemented services with the data processing system using the software; and in a second instance of the determination where the at least one certificate does not establish that the software meets the access control standards for the data processing system: rejecting the software for deployment, and providing computer implemented services using the data processing system without the software.

The at least one certificate may be a cryptographically verifiable data structure issued by an entity trusted by the deployment.

The at least one certificate may correspond to a portion of source code on which the software is based, and the at least one certificate may be an attestation that indicates that the entity has vetted the portion of the source code for compliance with the access control standards.

The access control standards may include a first portion specifying access checks that are to be performed by the software prior to allowing a user to request access to data; and a second portion specifying a level of consistency in use of sources of truth regarding privilege of users to access the data in the access checks.

The level of consistency may be complete consistency for access checks performed by the software.

The method may also include, prior to identifying the software: obtaining a new portion of source code for the software, the new portion being generated by a developer using a software development environment; making a second determination regarding whether the new portion of source code meets the access control standards; in a first instance of the second determination where the new portion of the source code meets the access control standards: integrating the new portion of source code into a code repository for the software, generating one or more of the at least one certificates, and obtaining the software using the code repository; and in a second instance of the second determination where the new portion of the source code does not meet the access control standards: rejecting the portion of the source code for integration into the code repository, and generating a report indicating at least one deviation of the portion of the source code from the access control standards.

The method may further include, in the second instance of the second determination where the new portion of the source code does not meet the access control standards:
  initiating revision of the portion of the source code using the report; and obtaining a revised portion of the source code to obtain the software.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may cause the computer-implemented method to be performed when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

As part of providing the computer implemented services, various types of information may be obtained and stored as part of data. The data may include sensitive information for which access restrictions may need to be put in place to, for example, comply with various regulations such as data privacy laws, to reduce the likelihood of the sensitive information being undesirably distributed, and/or for other purposes. To implement access restrictions, various types of access control frameworks may be used. The access control frameworks may include, for example, role based access controls (RBACs). Under RBACs, the roles of users are used to discriminate data to which the users are to be provided access from data to which the users are not to be provided access.

To provide the computer implemented services, the system of FIG. 1 may include deployment 100. Deployment 100 may include any number of data processing systems (e.g., 100A-100N). The data processing systems may provide, at least in part, the computer implemented services provided by the system of FIG. 1.

To provide the computer implemented services, the data processing system may host any number of instances of software. For example, the data processing systems may include processors that execute computer instructions specified by the software. The execution of these instructions may cause the data processing systems to perform various operations that contribute to the computer implemented services.

However, the type and quality of computer implemented services provided by data processing systems 100A-100N may depend on the software hosted by the data processing systems. Thus, if software that exhibits various undesirable characteristics is hosted by the data processing systems, then the resulting computer implemented services provided by deployment 100 may also exhibit the undesirable characteristics.

For example, consider a scenario where software hosted by the data processing systems inconsistently includes checks regarding whether users are of the software are to be provided with access to various portions of data in accordance with RBACs. If the portions of data include sensitive information, then access to the sensitive information may be provided to users of the software even if access to the sensitive information is to be restricted because of the inconsistent use of access checks and/or inconsistent use of sources of truth with respect to the access granted to the users under RBACs.

In general, embodiments disclosed here relate to systems and methods for providing computer implemented services using software. To provide the computer implemented services, software may be deployed to data processing systems. To ensure a level of quality of the computer implemented services, software may be screened with respect to levels of compliance with access control frameworks prior to allowing the software to be deployed. Only software that meets screening requirements may be allowed to be deployed to the system.

To facilitate screening, portions of source code on which software is based may be syntactically screened for (i) access checks prior to allowing users of software to request access to data, and (ii) consistency in sources of truth regarding whether users are allowed to access different portions of data used in the access checks. Portions of source code that meet the screening requirements (e.g., as defined by access control standards) may be integrated into source code repositories on which software is based. Additionally, attestations for these portions of source codes may be issued. Portions of source code that do not meet the screening requirements may be barred for integration into the source code repositories.

By doing so, embodiments disclosed herein may improve the likelihood that computer implemented services provided to users meet access control standards. Consequently, the computer implemented services may be less likely to exhibit undesired distribution of information, undesired behaviors such as presenting data as being available to a user but then restricting or limiting access to the data inconsistently with the presentation, and/or may otherwise be more desirable.

To provide the above noted functionality, the system may include deployment 100, software development system 105, and communication system 102. Each of these components is discussed below.

Software development system 105 may include any number of data processing systems 105A-105N. Data processing systems 105A-105N may include software development tools for software development. For example, the software development tools may include integrated development environments. The integrated development environments may include (i) automation tools for analyzing source code on which software is based for compliance with access control standards, and (ii) certificate issuance tools through which attestations or other cryptographically verifiable data structures may be generated. Refer to FIGS. 2A-2B for additional details regarding software development using software development system 105 and operation of software developed by the software development tools.

Deployment 100 may include any number of data processing systems 100A-100N. Data processing system 100A-100N may host software generated by software development system 105. Through use of the software, deployment 100 may provide any number and type of computer implemented services.

Figure 2C:
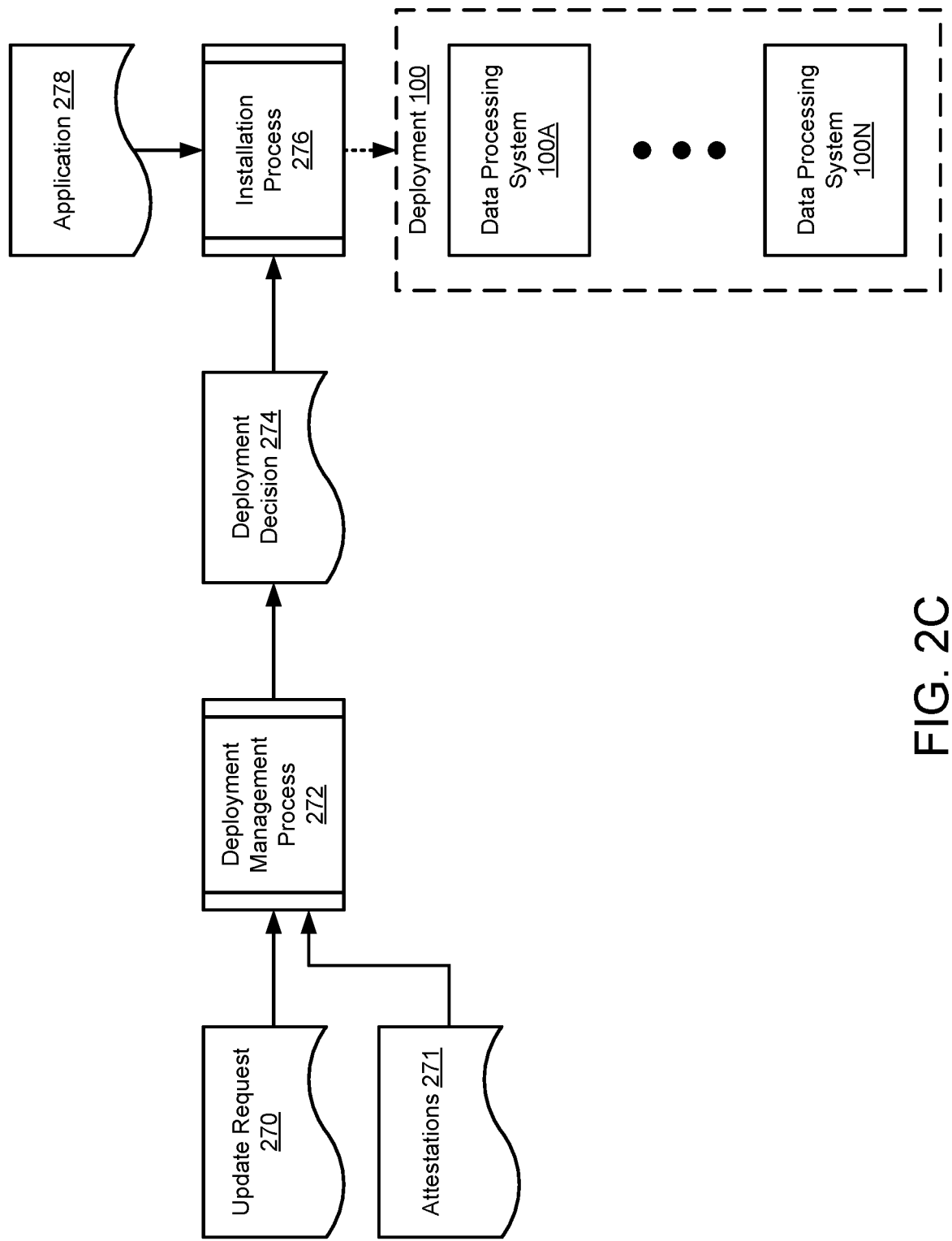

To improve the likelihood that the computer implemented services provided by deployment 100 are desirable and/or are less likely to exhibit undesirable behavior, software may be restricted from being deployed to deployment 100 based on the level of compliance of the software with access control standards. The level of compliance may be ascertained using attestations or other cryptographically verifiable data structures issued by software development system 105. Refer to FIG. 2C for additional details regarding restricting deployment of software to data processing systems 100A-100N.

When providing their functionalities, software development system 105 and/or deployment 100 (and/or components thereof) may perform all, or a portion, of the data flows and/or methods shown in FIGS. 2A-3B.

Any of (and/or components thereof) software development system 105 and deployment 100 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

While illustrated in FIG. 1 as including a limited number of specific components, a system in accordance with an embodiment may include fewer, additional, and/or different components than those components illustrated therein.

Thus, as shown in FIG. 1, a system in accordance with an embodiment may automate threat modeling for software that may be deployed in an environment within deployment 100.

To further clarify embodiments disclosed herein, data flow diagrams in accordance with an embodiment are shown in FIGS. 2A-2C. In these diagrams, flows of data and processing of data are illustrated using different sets of shapes. A first set of shapes (e.g., 200, 204, etc.) is used to represent data structures, and a second set of shapes (e.g., 202, 206, etc.) is used to represent processes performed using and/or that generate data.

Turning to FIG. 2A, a first data flow diagram in accordance with an embodiment is shown. The first data flow diagram may illustrate data used in and data processing performed in development of software that may be hosted by data processing systems.

To develop software, a developer (e.g., a person, an automated system such as a large language model trained to produce source code) may generate new code 200. New code may be source code which may be compiled (in isolation and/or in combination with other code) to obtain executable software.

New code 200 may be developed using a development environment. The development environment may include functionality to perform various checks of new code as it is developed for compliance with access control checking standards 204 and access control verification standards 208.

Access control checking standards 204 may specify, for example, standards for authorization checks that are to be performed before presenting data as being available for access by a user of software. For example, access control checking standards 204 may specify that RBAC checks must be included in new code 200 before new code 200 presents various types of data as being available for access. The types of data may include all types of data, or only some types of data (e.g., RBAC checks may only need to be performed for certain types of data, certain sources of data, etc.).

Access control verification standards 208 may a level of consistency for sources of truth regarding the level of privilege granted to different roles for the access checks required by access control checking standards 204. For example, access control verification standards 208 may specify that all of the access checks required by access control checking standards 204 use a same set of associations between different roles of user and permissions for access to different type of data, access checks for different sources or types of data are to use corresponding associations between different roles of user and permissions for access to different type of data, etc. In other words, access control verification standards 208 may require that different RBAC checks for the same type or source of data are performed using the same associations.

For example, consider a scenario in which new code 200 includes a first portion corresponding to a front end app (e.g., a user client) and a second portion corresponding to a back end app (e.g., a database to service requests for data from the user client). In this scenario access control checking standards 204 may specify that RBAC checks are to be performed by the front end app prior to presenting any information regarding data stored in the database to the user and that RBAC check are to be performed prior to the database servicing queries from the front end app. Likewise, Access control verification standards 208 may specify that both RBAC checks performed by the front end and back end apps are to use a same source (e.g., a table) that defines the portions of data from the database which different roles have permission to read, write, modify, and/or otherwise utilize.

To ascertain the level of compliance that new code 200 has with respect to these standards (e.g., 204, 208), code check analysis 202 and consistency analysis 206 may be performed.

During code check analysis 202, new code 200 may be syntactically analyzed to identify (i) when sources of data are utilized, and (ii) whether RBAC access checks are in place for each utilization of each data source (e.g., collectively "checking information"). The identified checking information for new code 200 may be compared to access control standards 204 to determine whether any deviations from the standards (e.g., 204) are present in new code 200.

For example, if a RBAC access check (e.g., some source code that identifies whether the role of a user has sufficient privilege for a use of data) for a use of data (e.g., presenting data from a data source as being available for use, querying for information from a source of data, etc.) is not included in new code 200 and access control checking standards 204 specifies that the data is subject to a RBAC check, then a deviation from the standards (e.g., 204) for checking may be identified.

Information regarding any identified deviations may be added to deviations 210. For example, the information may include identifiers for the corresponding portions of new code 200, information regarding a basis for the identification of the deviation, information regarding how the identified portion of new code 200 could be modified to eliminate the deviations, etc.

During consistency analysis 206, new code 200 may be syntactically analyzed to identify (i) RBAC checks present in new code 200, and (ii) sources of truth regarding permissions of users for various portions of data used in the identified RBAC checks (e.g., collectively "consistency information"). The consistency information for new code 200 may be compared to access control verification standards 208 to determine whether any deviations from the standards (e.g., 208) are present in new code 200.

For example, two RBAC checks for a particular source of data that use different permission lists for users and/or other sources of truth, then a deviation from the standards (e.g., 208) for the RBAC checks may be identified.

In another example, two RBAC checks a particular type of data use different permission lists for user and/or other sources of truth, then a deviation from the standards (e.g., 208) for the RBAC checks may be identified.

Information regarding any identified deviations may be added to deviations 210. For example, the information may include identifiers for the portions of new code 200 corresponding to the RBAC checks that use inconsistent sources of truth, information regarding the inconsistent sources of truth, etc.

Once deviations 210 for new code 200 is obtained, deviation analysis 212 may be performed to obtain new code decision 214 and/or one or more attestations (e.g., 216). During deviation analysis 212, deviations 210 may be analyzed to identify whether new code 200 is acceptable. During the analysis of deviations 210, the number, types, and/or other characteristics of deviations from the standards (e.g., 204, 208) may be compared to thresholds and/or other types of criteria to determine whether new code 200 is acceptable. The criteria may be specified by the standards (e.g., 204, 208).

New code decision 214 may specify whether (i) whether new code 200 is acceptable and/or (ii) if unacceptable, information usable to revise new code 200 to be more likely to meet the standards (e.g., 204, 208). The information may include any of the information from deviations 210, and/or other information that contextualizes and/or otherwise improves the usability of the information from deviations 210.

If new code 200 is acceptable, one or more attestations (e.g., 216) may be generated. The attestation may be a cryptographically verifiable data structure. For example, new code 200 may be implemented using a certificate signed using a private key maintained by software development system 104. A corresponding public key may be distributed to deployment 100 and/or other entities so that the attestations may be verified.

The attestations may include, for example, hashes of executable software (e.g., all or a portion of a software image) that incorporates new code 200 so that the software which is at least in part attested to using the attestations may be verified as being attested to by software development system 104.

Additionally, if new code 200 is acceptable, new code 200 may be integrated into a code base. The code base may be used to obtain the software through compilation of all or portion of the source code in the code base to executable code.

In contrast, if new code 200 is unacceptable, then new code 200 may be rejected for integration into the code base and the new code decision (e.g., 214) may be used as a report regarding why new code 200 is unacceptable. The report may be returned to the developer of new code 200 to initiate revision of new code 200 to place it into compliance with the standards (e.g., 204, 208).

In FIG. 2A, the line between deviation analysis 212 and attestation 216 is drawn in dashing to indicate that no attestations may be generated when new code 200 does not meet the standards.

Thus, using the data flow shown in FIG. 2A, embodiments disclosed herein may increase the likelihood of software including RBAC access checks that are consistent with respect to the permissions granted to different roles (e.g., different users that use software may have different roles).

Turning to FIG. 2B, a second data flow diagram in accordance with an embodiment is shown. The second data flow diagram may illustrate data used in and data processing performed in operation of software.

During operation of software, various action flows (e.g., 230, 250) may be performed by various processes instantiated when computer instructions are performed. These action flows may correspond to different portions of an architecture of a software.

For example, consider a scenario where a software is architected to include a front end app that utilizes database services provided by a backend application. To enforce RBAC, access checks and consistent sources of truth may need to be implemented by the front end and back end apps of the software architecture. By producing the software via the flow shown in FIG. 2A, the software may include the requisite checks and the checks may use consistent sources of truth.

During action flow 230, various actions (e.g., 232-240) may be performed in accordance with the software instructions. Action 232 may include presentation of a graphical user interface (GUI) to a user. Request action 234 may include obtaining user input via the GUI that indicates that the user would like to see a presentation of information available from a source of data (e.g., 262).

Prior to presentation of the data, check action 236 may be performed. Check action 236 may be a RBAC access check using role authority data 260 as a source of truth for permission for use of data granted to the user. In this example, role authority data 260 specifies that the user has permission to read data from secure data 262.

Based on the outcome of check action 236, query action 238 may be performed as part of action flow 230. Had the user not been granted permission for secure data 262, a different type of action (e.g., to indicate no data is available) may be performed. During query action 238, an application programming interface for the database may be invoked to obtain data from secure data 262.

Turning to action flow 250, action flow 250 may correspond to actions performed by the application programming interface and/or other computer instructions of the database. The database may manage secure data 262.

Action flow 250 may also include various actions (e.g., 252-258). Receive action 252 may include processing of the information received from the front end application to determine the functionality of the database being invoked by the request from the front end application. In this example, the functionality is to provide data from secure data 262.

Prior to providing the data, action check 254 may be performed. Action check 254 may be a RBAC similar to that performed during action check 236 and using a similar source of truth (e.g., 260). Thus, like the front end application, the database application may also include RBAC checks using the same source of truth. Thus, the action flows performed by both portions of the software may meet the standards imposed by a software development system.

Once the user is verified as having permission for accessing secure data 262, collection action 256 may be performed to gather the requested data. Once gather, distribution action 258 may be performed to provide the gather data to the front end application. The data may be processed by the front end application via retrieval action 240.

Once obtained, the data may be used in subsequent portions of action flow 230.

Thus, as seen in FIG. 2B, enforcement of the standards as described with respect to FIG. 2A may result in software that, when executed, performs RBAC checks using consistent sources of truth for permissions granted to users for various portions of data.

Turning to FIG. 2C, a third data flow diagram in accordance with an embodiment is shown. The first data flow diagram may illustrate data used in and data processing performed in deployment of software to data processing systems.

To deploy software to data processing systems, an administrator other person may send update request to deployment management process 272. Deployment management process 272 may be a process performed by an orchestrator, the data processing systems of a deployment, and/or another entity. During deployment management process 272, update request 270 may be analyzed to determine whether it should be complied with. Update request 270 may specify that various software is to be deployed to one or more data processing systems governed by deployment management process 272.

To ascertain whether the requested software will be deployed to the data processing systems, attestations 271 for the requested software may be obtained and analyzed to determine whether the software meets standards imposed on deployment 100. For example, an administrator may specify the standards (e.g., 204, 208) which software must meet for it to be deployed to the data processing systems of deployment 100.

To make the determination, the attestations for the software may be verified (e.g., using a public key that is trusted by the deployment) and the attestations that are verified may be analyzed to ascertain whether they indicate that the software meets the standards for the deployment. For example, when source code used in the software meets a standard, an identifier or other indicator of the complied with standard may be added to an attestation. Thus, if the attestations specify or otherwise indicate that the software complies with the standards for the deployment, then the software may be identified as being acceptable for deployment to deployment 100. The result of deployment management process 272 may be recorded in deployment decision 274.

If deployment decision 274 is in the affirmative, then installation process 276 may be performed. Installation process may be performed by a software deployment automation framework. During installation process 276, application 278 may be installed on one or more of the data processing systems of deployment 100. Application 278 may be the software specified by update request 270, and the data processing systems to which the application is installed may be specified or otherwise indicated by update request 270.

Thus, using the data flow shown in FIG. 2C, only software meeting access control standards for deployment 100 may be deployed to deployment 100. Consequently, the computer implemented services provided by deployment 100 may be more likely to meet expectations and/or may be less likely to exhibit undesired behavior due to lack of and/or inconsistent implementation of RBAC checks.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
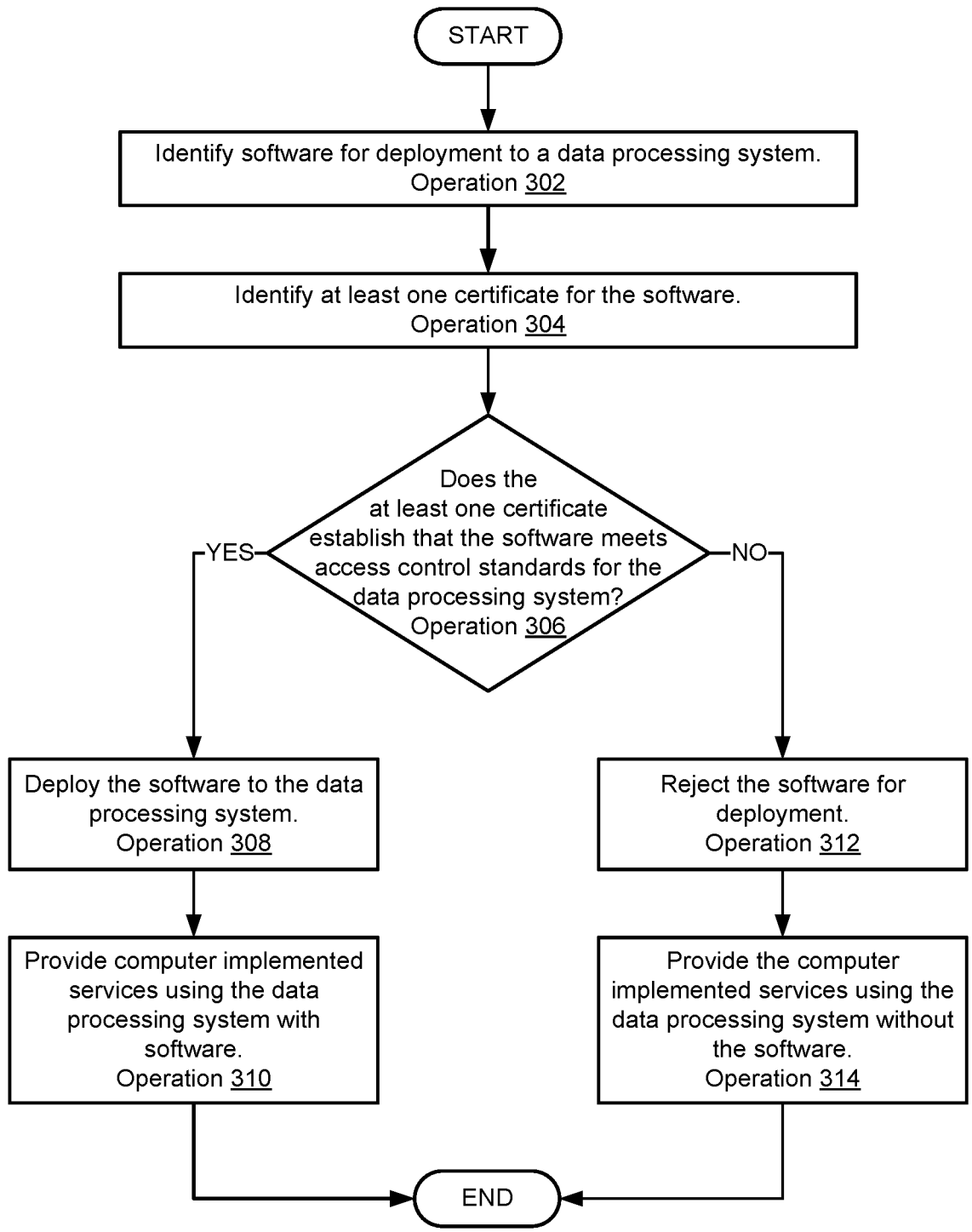
FIGS. 3A-3B show flow diagrams illustrating methods in accordance with an embodiment.
Figure 3B:
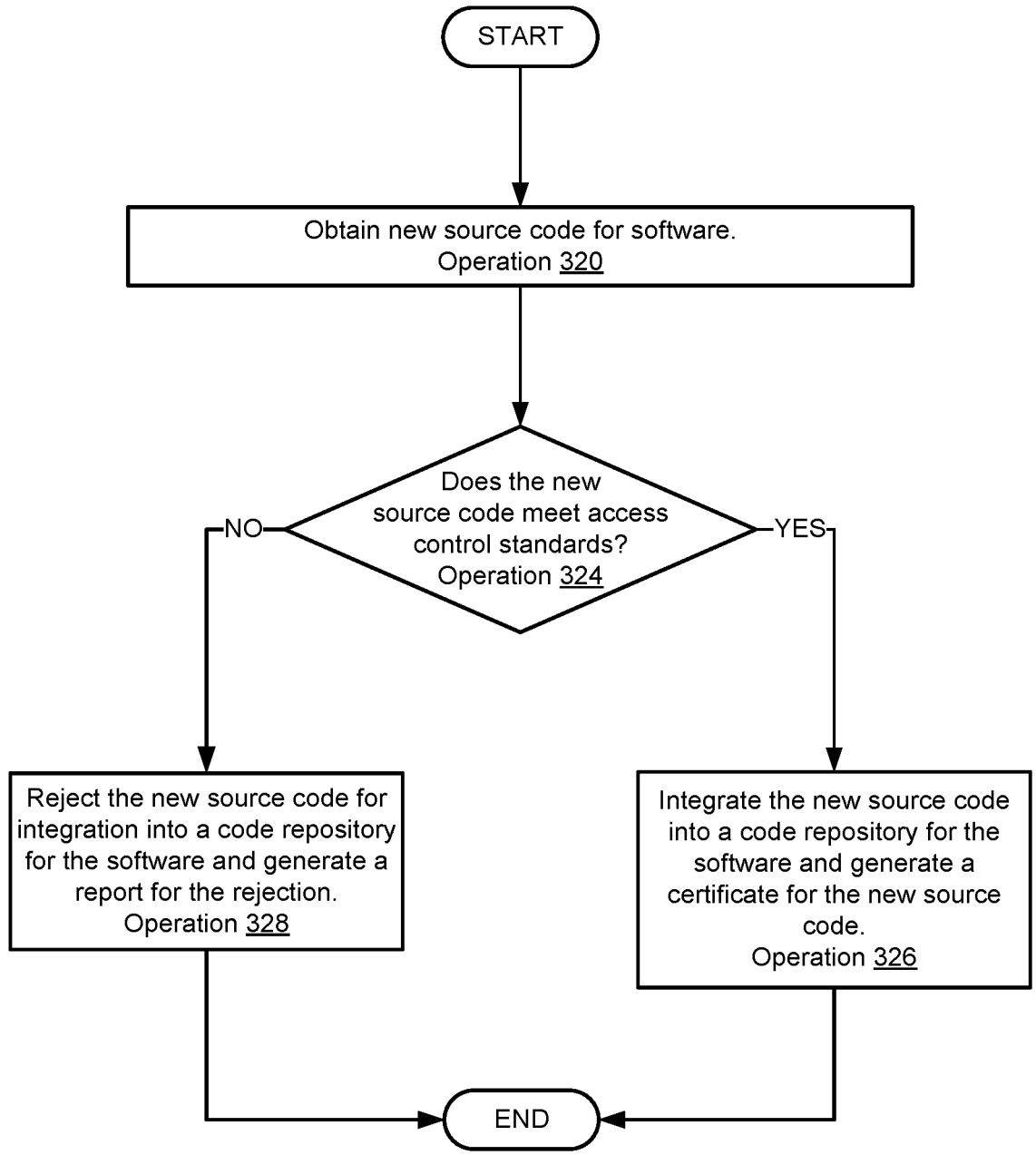

As discussed above, the components of FIG. 1 may perform various methods to manage operation of data processing systems. FIGS. 3A-3B illustrate methods that may be performed by the components of FIG. 1. In the diagrams discussed below and shown in FIGS. 3A-3B, any of the operations may be repeated, performed in different orders, and/or performed in parallel with and/or in a partially overlapping in time manner with other operations.

Turning to FIG. 3A, a first flow diagram illustrating a method of managing operation of data processing systems of a deployment in accordance with an embodiment is shown. The method may be performed, for example, by any of the components of the system of FIG. 1, and/or other components not shown therein.

At operation 302, software for deployment to a data processing system of a deployment is identified. The software may be identified by obtaining a request for deployment of the software to the data processing system. The request may be received from another device, may be generated based on user input, and/or via other methods.

At operation 304, at least one certificate for the software is identified. The at least one certificate may be identified by searching a certificate repository based on an identity of the software. The at least one certificate may be an alleged attestation for the software.

At operation 306, a determination may be made regarding whether the at least one certificate establishes that the software meets access control standards for the data processing system. The determination may be made by (i) attempting to verify the at least one certificate using trusted public keys (e.g., through signature verification), (ii) for any of the at least one certificate that can be verified, comparing the content of the certificate to the software (e.g., to verify authenticity of the software, such as through hash verification of the software based on a hashes in the certificates) and using the content of the certificate to determine if the software meets the access control standards (e.g., the certificates may specify compliance of the software with respect to access control standards). The access control standards may be specified by an administrator of the data processing system.

If the at least one certificate establishes that the software meets the access control standards, then the method may proceed to operation 308. Otherwise the method may proceed to operation 312.

At operation 308, the software is deployed to the data processing system. The software may be deployed by installing it on the data processing system.

At operation 310, computer implemented services are provided using the data processing system with the software. The computer implemented services may be provided, at least in part, by execution of the software by the data processing system.

The method may end following operation 310.

Returning to operation 306, the method may proceed to operation 312 when the at least one certificate does not establish that software does not meet the access control standards.

At operation 312, the software is rejected for deployment. The software may be rejected by not installing it on the data processing system, and/or by performing remedial action such as, for example, suggesting other similar software that can be established as meeting the access control standards to a requestor of installation of the software, by notifying the requestor that the software will not be installed, etc.

At operation 314, computer implemented services are provided using the data processing system without the software. The computer implemented services may be provided, at least in part, by execution of other software hosted by the data processing system.

The method may end following operation 314.

Thus, using the method shown in FIG. 3A, embodiments disclosed herein may facilitate use of software that meets access control standards for a deployment. However, to do so, various certificates for software may need to be available.

Turning to FIG. 3B, a first flow diagram illustrating a method of developing software in accordance with an embodiment is shown. The method may be performed, for example, by any of the components of the system of FIG. 1, and/or other components not shown therein.

At operation 320, new source code for the software may be obtained. The new source code may be obtained by (i) reading the new source code from storage, (ii) receiving the new source code from another device, (iii) generating it based on user input obtained from a user.

At operation 324, a determination is made regarding whether the new source code meets access control standards. The determination may be made by (i) syntactically analyzing the new source code to identify any deviations from access control checking standards and access control verification standards, and (ii) comparing the deviation to criteria that discriminates source code that meets the access control standards from other source code that does not meet the access control standards.

If the new source code meets the access control standards, then the method may proceed to operation 326. Otherwise, the method may proceed to operation 328.

At operation 326, the new source code is integrated into a code repository for the software, and a certificate for the new source code is generated. The new source code may be integrated by adding it to the code repository (e.g., via a check in procedure). The certificate may be generated by (i) obtaining a hash of software based on the code repository (and that uses the new source code), (ii) obtaining identifiers for the access control standards, and (iii) using the hash and identifiers as a payload, and signing the payload using a private key.

The method may end following operation 326.

Returning to operation 324, the method may proceed to operation 328 if the new source code does not meet the access control standards.

At operation 328, the new source code is rejected for integration into the code repository for the software, and a report for the rejection is generated. The new source code may be rejected by notifying a contributor (e.g., a developer) that it will not be integrated, and by providing a copy of the report to the contributor. Doing so may cause the contributor to revise or otherwise update the new source code to hopefully meet the access control standards.

The report may be obtained by adding information regarding the deviations, suggestions for changes, and/or other information regarding why the new source code does not meet the access control standards to the report.

The method may end following operation 328.

Thus, using the method illustrated in FIG. 3B, embodiments disclosed herein may reduce the likelihood of software exhibiting undesired activity due to inconsistent and or omitted RBAC checks.

Figure 4:
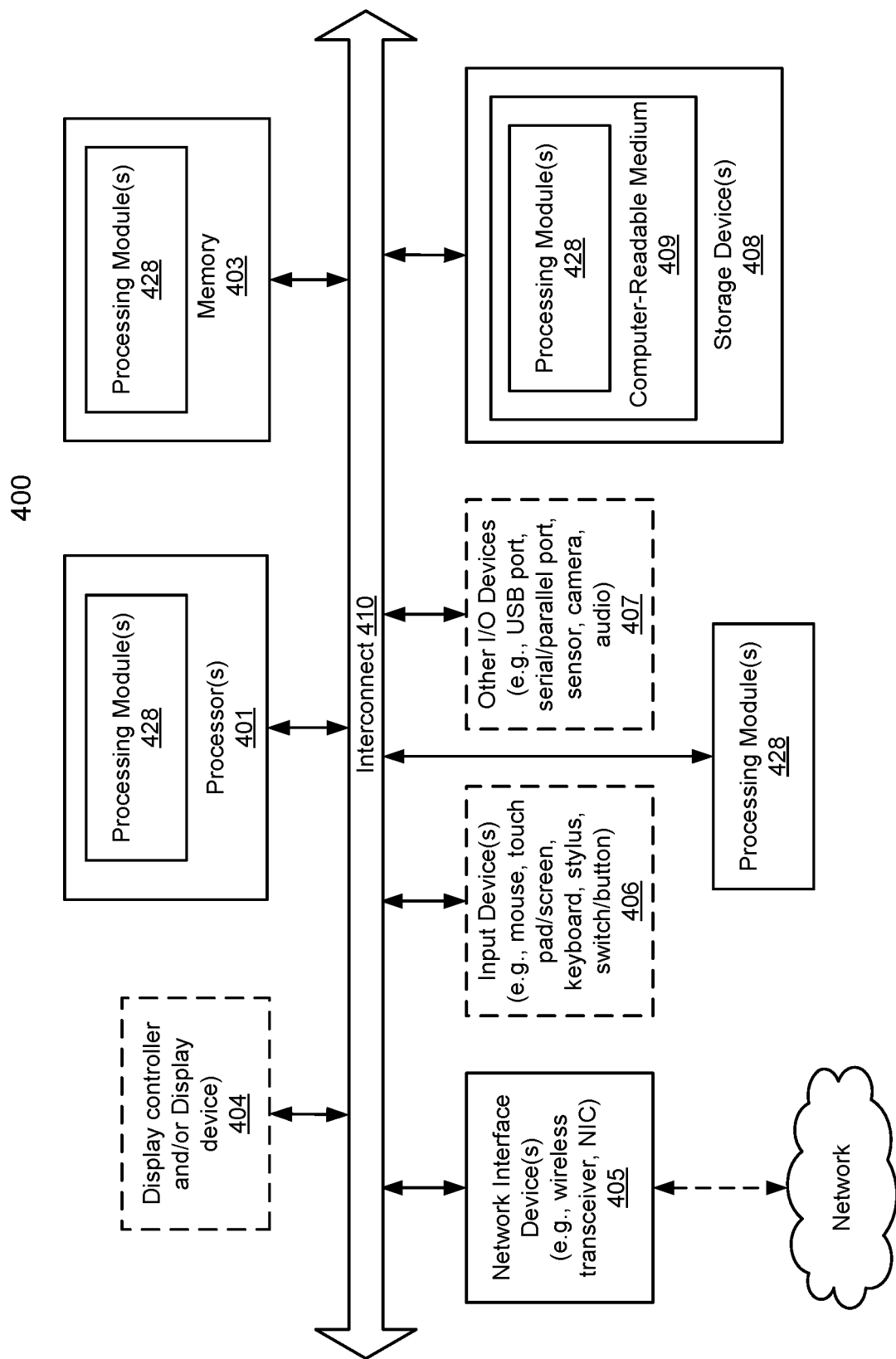
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for securing a deployment comprising data processing systems, the method comprising:
    identifying software for deployment to a data processing system of the data processing systems;
    based on the identifying of the software:
        identifying at least one certificate for the software, the at least one certificate being a cryptographically verifiable data structure;
        making a determination regarding whether the at least one certificate establishes that the software meets access control standards for the data processing system, the access control standards specify access checks to be performed for a user to request access to data;
        in a first instance of the determination where the at least one certificate establishes that the software meets the access control standards for the data processing system:
            deploying the software to the data processing system, and
            providing computer implemented services with the data processing system using the software; and
        in a second instance of the determination where the at least one certificate does not establish that the software meets the access control standards for the data processing system:
            rejecting the software for deployment, and
            providing computer implemented services using the data processing system without the software.

2. The method of claim 1, wherein the at least one certificate is issued by an entity trusted by the deployment.

3. The method of claim 2, wherein the at least one certificate corresponding to a portion of source code on which the software is based, and the at least one certificate is an attestation that indicates that the entity has vetted the portion of the source code for compliance with the access control standards.

4. The method of claim 1, wherein the access control standards comprise:
    a first portion specifying the access checks, the access checks are to be performed by the software prior to allowing the user to request access to the data; and
    a second portion specifying a level of consistency in use of sources of truth regarding privilege of users to access the data in the access checks.

5. The method of claim 4, wherein the level of consistency is complete consistency for access checks performed by the software.

6. The method of claim 4, further comprising:
    prior to identifying the software:
        obtaining a new portion of source code for the software, the new portion being generated by a developer using a software development environment;
        making a second determination regarding whether the new portion of source code meets the access control standards;

in a first instance of the second determination where the
new portion of the source code meets the access
control standards:
integrating the new portion of source code into a
code repository for the software,
generating one or more of the at least one certificates,
and
obtaining the software using the code repository; and
in a second instance of the second determination where
the new portion of the source code does not meet the
access control standards:
rejecting the portion of the source code for integration into the code repository, and
generating a report indicating at least one deviation
of the portion of the source code from the access
control standards.

7. The method of claim 6, further comprising:
in the second instance of the second determination where
the new portion of the source code does not meet the
access control standards:
initiating revision of the portion of the source code
using the report; and
obtaining a revised portion of the source code to obtain
the software.

8. A non-transitory machine-readable medium having instructions stored therein, which when executed by a processor, cause operations for securing a deployment comprising data processing systems to be performed, the operations comprising:
identifying software for deployment to a data processing system of the data processing systems;
based on the identifying of the software:
identifying at least one certificate for the software, the at least one certificate being a cryptographically verifiable data structure;
making a determination regarding whether the at least one certificate establishes that the software meets access control standards for the data processing system, the access control standards specify access checks to be performed for a user to request access to data;
in a first instance of the determination where the at least one certificate establishes that the software meets the access control standards for the data processing system:
deploying the software to the data processing system, and
providing computer implemented services with the data processing system using the software; and
in a second instance of the determination where the at least one certificate does not establish that the software meets the access control standards for the data processing system:
rejecting the software for deployment, and
providing computer implemented services using the data processing system without the software.

9. The non-transitory machine-readable medium of claim 8, wherein the at least one certificate is issued by an entity trusted by the deployment.

10. The non-transitory machine-readable medium of claim 9, wherein the at least one certificate corresponding to a portion of source code on which the software is based, and the at least one certificate is an attestation that indicates that the entity has vetted the portion of the source code for compliance with the access control standards.

11. The non-transitory machine-readable medium of claim 8, wherein the access control standards comprise:

a first portion specifying the access checks, the access checks are to be performed by the software prior to allowing the user to request access to the data; and
a second portion specifying a level of consistency in use of sources of truth regarding privilege of users to access the data in the access checks.

12. The non-transitory machine-readable medium of claim 11, wherein the level of consistency is complete consistency for access checks performed by the software.

13. The non-transitory machine-readable medium of claim 11, wherein the operations further comprise:
prior to identifying the software:
obtaining a new portion of source code for the software, the new portion being generated by a developer using a software development environment;
making a second determination regarding whether the new portion of source code meets the access control standards;
in a first instance of the second determination where the new portion of the source code meets the access control standards:
integrating the new portion of source code into a code repository for the software,
generating one or more of the at least one certificates, and
obtaining the software using the code repository; and
in a second instance of the second determination where the new portion of the source code does not meet the access control standards:
rejecting the portion of the source code for integration into the code repository, and
generating a report indicating at least one deviation of the portion of the source code from the access control standards.

14. The non-transitory machine-readable medium of claim 13, wherein the operations further comprise:
in the second instance of the second determination where the new portion of the source code does not meet the access control standards:
initiating revision of the portion of the source code using the report; and
obtaining a revised portion of the source code to obtain the software.

15. A management system, comprising:
a processor; and
a memory coupled to the processor to store instructions, which when executed by the processor, cause the processor to perform operations securing software architectures, the operations comprising:
identifying software for deployment to a data processing system of the data processing systems;
based on the identifying of the software:
identifying at least one certificate for the software, the at least one certificate being a cryptographically verifiable data structure;
making a determination regarding whether the at least one certificate establishes that the software meets access control standards for the data processing system, the access control standards specify access checks to be performed for a user to request access to data;
in a first instance of the determination where the at least one certificate establishes that the software meets the access control standards for the data processing system:
deploying the software to the data processing system, and providing computer implemented services with the data processing system using the software; and in a second instance of the determination where the at least one certificate does not establish that the software meets the access control standards for the data processing system:
rejecting the software for deployment, and
providing computer implemented services using the data processing system without the software.

16. The management system of claim 15, wherein the at least one certificate is issued by an entity trusted by the deployment.

17. The management system of claim 16, wherein the at least one certificate corresponding to a portion of source code on which the software is based, and the at least one certificate is an attestation that indicates that the entity has vetted the portion of the source code for compliance with the access control standards.

18. The management system of claim 15, wherein the access control standards comprise:
a first portion specifying the access checks, the access checks are to be performed by the software prior to allowing the user to request access to the data; and
a second portion specifying a level of consistency in use of sources of truth regarding privilege of users to access the data in the access checks.

19. The management system of claim 18, wherein the level of consistency is complete consistency for access checks performed by the software.

20. The management system of claim 18, wherein the operations further comprise:
prior to identifying the software:
obtaining a new portion of source code for the software, the new portion being generated by a developer using a software development environment;
making a second determination regarding whether the new portion of source code meets the access control standards;
in a first instance of the second determination where the new portion of the source code meets the access control standards:
integrating the new portion of source code into a code repository for the software,
generating one or more of the at least one certificates, and
obtaining the software using the code repository; and
in a second instance of the second determination where the new portion of the source code does not meet the access control standards:
rejecting the portion of the source code for integration into the code repository, and
generating a report indicating at least one deviation of the portion of the source code from the access control standards.

* * * * *